(12) United States Patent
Takahashi et al.

(10) Patent No.: US 7,509,482 B2
(45) Date of Patent: Mar. 24, 2009

(54) ORDERLY PROCESSING READY ENTRIES FROM NON-SEQUENTIALLY STORED ENTRIES USING ARRIVAL ORDER MATRIX REORDERED UPON REMOVAL OF PROCESSED ENTRIES

(75) Inventors: Takuji Takahashi, Kawasaki (JP); Masahiro Kuramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/453,895

(22) Filed: Jun. 16, 2006

(65) Prior Publication Data
US 2007/0204136 A1 Aug. 30, 2007

(30) Foreign Application Priority Data
Feb. 27, 2006 (JP) ............... 2006-050798

(51) Int. Cl.
*G06F 9/38* (2006.01)
(52) U.S. Cl. ....................... 712/214; 712/215
(58) Field of Classification Search ................. None
See application file for complete search history.

(56) References Cited

U.S. PATENT DOCUMENTS

| 4,320,466 | A | * | 3/1982 | Myers | .......... | 711/217 |
|---|---|---|---|---|---|---|
| 5,684,971 | A | | 11/1997 | Martell et al. | | |
| 6,108,771 | A | | 8/2000 | Gaertner | | |
| 6,185,672 | B1 | * | 2/2001 | Trull | .......... | 712/217 |
| 6,704,856 | B1 | * | 3/2004 | Farrell et al. | .......... | 712/215 |

2005/0289305 A1 12/2005 Chieh

FOREIGN PATENT DOCUMENTS

| EP | 1 164 472 A2 | 12/2001 |
|---|---|---|
| JP | 8-110901 | 4/1996 |
| JP | 2000-48549 | 2/2000 |
| JP | 2002-207595 | 7/2002 |
| JP | 2002-304823 | 10/2002 |
| KR | 2003-0042289 | 5/2003 |
| KR | 10-2004-0082532 | 9/2004 |

OTHER PUBLICATIONS

Extended European Search Report, mailed Apr. 29, 2008 and issued in corresponding European Patent Application No. 06116289.7-1243.

* cited by examiner

*Primary Examiner*—Kenneth S Kim
(74) *Attorney, Agent, or Firm*—Staas & Halsey LLP

(57) ABSTRACT

A memory device stores entries waiting to be processed. Row numbers of matrix information correspond to storage positions within the memory device, column numbers correspond to positions within the order of the entries, and every matrix element corresponding to the storage position and the position within the order of the entry stored in this storage position has a predetermined value. An operation between the first vector information indicating storage positions of processable entries and each column of the matrix information is performed and the second vector information indicating positions within the order of the processable entries is generated. Then, a position to be processed is selected from among the positions of processable entries indicated by the second vector information, an element having the predetermined value in the column corresponding to the selected position is obtained, and an entry in the storage position corresponding to the element is processed.

12 Claims, 14 Drawing Sheets

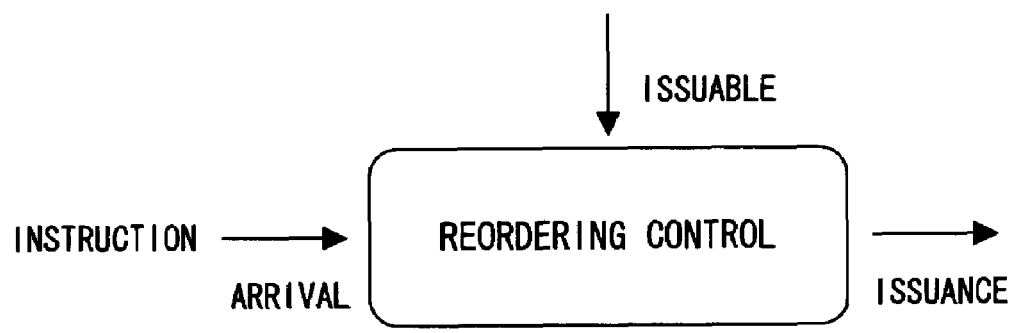
F I G. 1

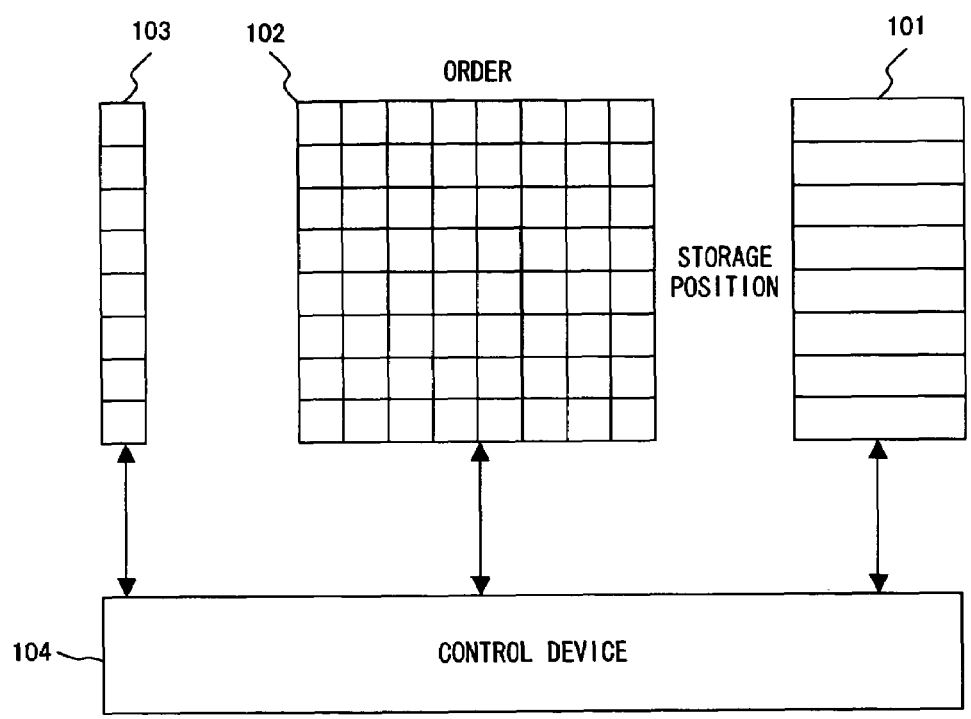
F I G. 2

| | ARRIVAL ORDER | 1 | 2 | 3 | 4 | 5 | 6 | 7 | 8 |
|---|---|---|---|---|---|---|---|---|---|
| 202 — | NEXT STORAGE POSITION | 1 | 0 | 0 | 0 | 0 | 0 | 0 | 0 |
| | #1 | 1 | 0 | 0 | 0 | 0 | 0 | 0 | 0 |
| | #2 | 0 | 1 | 0 | 0 | 0 | 0 | 0 | 0 |
| | #3 | 0 | 0 | 1 | 0 | 0 | 0 | 0 | 0 |
| 203 — STORAGE POSITION | #4 | 0 | 0 | 0 | 1 | 0 | 0 | 0 | 0 |
| | #5 | 0 | 0 | 0 | 0 | 1 | 0 | 0 | 0 |
| | #6 | 0 | 0 | 0 | 0 | 0 | 1 | 0 | 0 |
| | #7 | 0 | 0 | 0 | 0 | 0 | 0 | 1 | 0 |
| | #8 | 0 | 0 | 0 | 0 | 0 | 0 | 0 | 1 |

FIG. 9

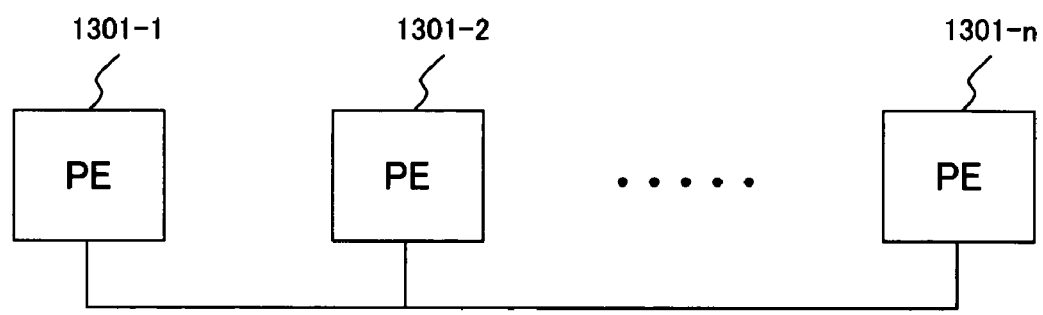
F I G. 1 3

ORDERLY PROCESSING READY ENTRIES FROM NON-SEQUENTIALLY STORED ENTRIES USING ARRIVAL ORDER MATRIX REORDERED UPON REMOVAL OF PROCESSED ENTRIES

BACKGROUND OF THE INVENTION

1. Field of the Invention

The present invention relates to a reordering apparatus that changes a processing order of a plurality of processing subjects, the processing subjects being instructions within an information processing device, packets within a packet transmitting and receiving device, and the like.

2. Description of the Related Art

In an instruction handling process performed by an information processing device, a reordering control that issues instructions in the sequence that ones ready to issue come ahead, rather than in the order that they have arrived, maybe performed. In this case, the instructions are realigned from in the arrival order to in which the instructions marked issuable precede, as shown in FIG. 1.

In this way, a plural number of instructions should be maintained simultaneously, but when it issues an instruction that is issuable while others arrived earlier are not, the average latency from the arrival to the issuance should be reduced, thereby to shorten the overall execution time.

The reordering controls like above, are conventionally implemented in microprocessors, magnetic disk devices, tape devices, and so on to optimize instruction processing (for example, refer to Patent Documents 1 to 3, below).

Patent Document 1: Japanese Laid-open Patent Application No. 08-110901

Patent Document 2: Japanese Laid-open Patent Application No. 2000-048549

Patent Document 3: Japanese Laid-open Patent Application No. 2002-304823

However, in a conventional reordering control, a complicated operation is required to retrieve instructions, searching which one can be issued while they keep aligned in the arrival order, and a certain amount of processing time is also required. However, a quick and accurate decision is desired concerning which instruction to issue when plural instructions are ready, to further shorten instruction execution time.

SUMMARY OF THE INVENTION

An object of the present invention is to quickly and accurately retrieve a processing subject that can be processed, among a plurality of processing subjects, such as an instruction within an information processing device, thereby reducing the time required to reorder the processing subjects.

According to the present invention, a reordering apparatus includes a memory device, a matrix device, a vector device, and a control device. The reordering apparatus holds a plurality of entries as processing subjects and changes the processing order of the entries from a first order to a second order.

The memory device separately stores a plurality of entries waiting to be processed in different storage positions. The matrix device holds matrix information. In the matrix information, the storage positions within the memory device correspond to row numbers and positions within the first order correspond to column numbers. Furthermore, in the matrix information, an element corresponding to the storage position and the position within the first order of an entry stored in this storage position has a predetermined value. The vector device holds first vector information that indicates the storage positions of one or more processable entries, among the storage positions within the memory device.

The control device first performs an operation between the first vector information and each column of the matrix information. Then, from the operation results of respective columns, the control device generates second vector information indicating the positions within the first order of one or more processable entries. Next, the control device selects the one to be processed from the positions within the first order of the one or more entries indicated by the second vector information and obtains the element having the predetermined value in the column corresponding to the selected position within the first order. Then, the control device processes the entry in the storage position corresponding to the obtained element, thereby actualizing the processing according to the second order.

BRIEF DESCRIPTION OF THE DRAWINGS

FIG. 1 is a diagram showing a conventional reordering control operation;

FIG. 2 is a principle diagram of a reordering apparatus according to the present invention;

FIG. 9 is a diagram showing initial values of the bit matrix;

FIG. 13 is a block diagram of a parallel computer.

DESCRIPTION OF THE PREFERRED EMBODIMENT

Figure 3:
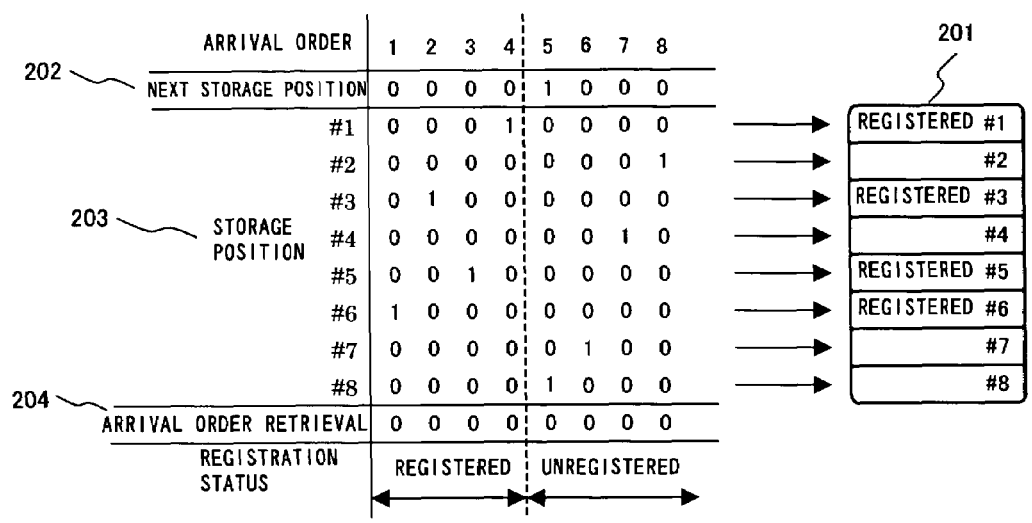
FIG. 3 is a diagram showing a first bit matrix.

Hereinafter, preferred embodiments of the present invention are described in detail, with reference to the accompanying drawings.

FIG. 2 is a principle diagram of a reordering apparatus according to the present invention. The reordering apparatus in FIG. 2 includes a memory device 101, a matrix device 102, a vector device 103, and a control device 104. The reordering apparatus holds a plurality of entries as processing subjects and changes the processing order of the entries from a first order to a second order.

The memory device 101 separately stores the plurality of entries waiting to be processed in different storage positions. The matrix device 102 holds matrix information. In the matrix information, the storage positions within the memory-device 101 correspond to row numbers and the positions within the first order correspond to column numbers. Furthermore, in the matrix information, every element corresponding to the storage position and the position within the first order of each entry stored in this storage position has a predetermined value. The vector device 103 holds first vector information that indicates the storage positions of one or more processable entries, among the storage positions within the memory device 101.

The control device 104 first performs an operation between the first vector information and each column of the matrix information. Then, from the operation results of respective columns, the control device 104 generates second vector information indicating the positions within the first order of one or more processable entries. Next, the control device 104 selects the one to be processed from the positions within the first order of the one or more entries indicated by the second vector information and obtains the element having the predetermined value in the column corresponding to the selected position within the first order. Then, the control device 104 processes the entry in the storage position corresponding to the obtained element, thereby actualizing the processing according to the second order.

The operation between the first vector information and each column of the matrix information is performed in parallel between each element of the first vector information and all elements of each column, and the operation results of respective columns are integrated into the second vector information.

If the second vector information includes a plurality of elements indicating the positions within the first order of the processable entries, one of the plurality of positions within the first order indicated by the elements is selected according to a predetermined policy, and the element having the predetermined value is obtained from the column in the matrix information corresponding to the selected position within the first order. Then, the storage position corresponding to the element having the predetermined value is obtained, and the entry stored in the obtained storage position within the memory device 101 is processed.

The memory device 101 corresponds, for example, to a memory region 201 in FIG. 3, described hereafter. The matrix information in the matrix device 102 corresponds, for example, to a bit matrix 203. The first vector information of the vector device 103 corresponds, for example, to a bit vector 205 in FIG. 5, described hereafter. The control device 104 corresponds, for example, to a reordering circuit in FIG. 11A and FIG. 11B or processing elements 1301-1 to 1301-n in FIG. 13, described hereafter.

According to the present invention, the position within the order of the entry that can be processed can be retrieved easily and quickly, simply by the operation between the vector information indicating the storage positions of the processable entries and each column of the matrix information. Therefore, time required to reorder the plurality of processing subjects is reduced.

In the reordering control operation in the present embodiment, an instruction that can be issued is retrieved quickly and accurately through the use of a bit matrix. A summary of the reordering control operation is as follows:

(1) A memory device that holds a bit matrix is provided. In the bit matrix, numbers correspond to a plurality of storage positions (addresses) in a memory region storing the instructions are row numbers, and numbers indicating the order in which the instructions arrived are column numbers.

In addition, all instructions waiting to be issued are stored separately in different storage positions within the memory region. Bit strings indicating the respective storage positions of the instructions are placed in the order in which the instructions arrive and stored in the plurality of columns of the bit matrix. In each bit string, logic "1" or "0" is stored in the bit corresponding to the storage position storing the instruction of the order, as a predetermined value. The other logic ("0" or "1") is stored in the bits corresponding to the other storage positions.

Furthermore, bit strings indicating the respective storage positions waiting to store instructions are aligned in an arbitrary order following the bit strings above, and also stored in the remaining plurality of columns of the bit matrix. In each bit string, logic "1" or "0" is stored in the bit corresponding to the storage position waiting to store an instruction, as a predetermined value. The other logic ("0" or "1") is stored in the bits corresponding to the other storage positions. As a result, a plurality of bit strings equivalent to all storage positions within the memory region is placed in order and held in the bit matrix.

(2) The position within the order of arrival of a certain instruction among all instructions waiting to be issued corresponds to the column number of the bit string indicating the storage position of this instruction, in the bit matrix. The positions within the order of all instructions that can be issued, among the instructions waiting to be issued, are determined using the bit matrix. Then, the position within the order of the instruction with the earliest arrival order, among the instructions that can be issued, is acquired.

(3) In the bit matrix, the storage position indicated by the bit string in the position within the order acquired in (2), above, is acquired. The storage position corresponds to the storage position of the instruction with the earliest arrival order, among all instructions that can be issued.

(4) The instruction in the storage position acquired in (3), above, is issued. Then, the bit string indicating the storage position of the issued instruction and all bit strings subsequent to the column number of that bit string are rotated and shifted so that the bit string indicating the storage position of the issued instruction comes last.

(5) After the operation in (4), above, the plurality of bit strings indicating the storage positions of the remaining instructions waiting to be issued are aligned in the order of arrival in successive positions within the order from the head column of the bit matrix. The plurality of bit strings indicating all storage positions waiting to store instructions are aligned in the positions within the order following these bit strings. Therefore, the state in (1), above, is maintained.

(6) A newly arrived instruction is stored in the storage position indicated by the bit string of the earliest order, among the plurality of bit strings indicating the storage positions waiting to store instructions in the bit matrix. As a result, the successive positions within the order in (5), above, is maintained and the state in (1), above, is maintained.

(7) To quickly perform the operation in (2), above, an expression in which a plurality of storage positions can be overlapped, such as a bit map of the storage position, is implemented as an expression of "the bit strings indicating the storage positions".

(8) To quickly perform the operation in (6), a pointer indicating the position within the order of the bit string of the earliest order, among the plurality of bit strings indicating the storage positions waiting to store instructions within the bit matrix, is held. When one instruction is stored in the memory region, the pointer indicates the next position within the order, and when one instruction is issued from the memory region, the pointer indicates the previous position within the order. In this way, the value of the pointer is increased and decreased. The next instruction to arrive is stored in the storage position indicated by the bit string in the position within the order indicated by the pointer, every time the pointer increases or decreases.

Next, an example of a reordering control, that registers instructions in a memory region having eight storage positions and sequentially issues instructions from the instructions that can be issued, is explained with reference to FIG. 3 to FIG. 9. In this case, positions within an arrival order, from 1 to 8, are assigned to respective storage positions, and positions within the order change every time an instruction is issued. Therefore, a bit matrix with eight rows and eight columns is used.

FIG. 3 shows the bit matrix 203 when four instructions are stored in the storage region 201, such as that above. The row numbers 1 to 8 in the bit matrix 203 respectively correspond to the storage positions #1 to #8 in the storage region 201. The column numbers 1 to 8 respectively correspond to the arrival orders 1 to 8 of the instructions.

In the bit strings of each column, a logic "1" bit indicates the storage position of an instruction waiting to be issued (registered instruction) or the storage position waiting to store an instruction. Logic "0" bits indicate the other storage positions. In this example, columns of the arrival orders 1 to 4 hold four bit strings that respectively indicate the storage positions #6, #3, #5, and #1 of the instructions waiting to be issued. Columns of the arrival orders 5 to 8 hold four bit strings that respectively indicate the storage positions #8, #7, #4, and #2 waiting to store instructions.

A bit vector 202 of the next storage position corresponds to the pointer described in (8), above. A logic "1" bit in the bit vector 202 indicates a column in the bit matrix 203 that holds the bit string indicating the storage position of the next instruction to arrive. In this example, the storage position #8 indicated by the bit string held in the column of arrival order 5 becomes the next storage position.

A bit vector 204 for arrival order retrieval expresses the retrieval results of the instructions that can be issued. A logic "1" bit in the bit vector 204 indicates a column in the bit matrix 203 that holds the bit string indicating the storage position of the instruction that can be issued. In this example, no instructions that can be issued as of yet, and thus, all bits in the bit vector 204 are logic "0".

When a new instruction arrives while in this state, the column of arrival order 5 indicated by the logic "1" bit in the bit vector 202 is retrieved, and the storage position #8 corresponding to the logic "1" bit is acquired as the next storage position. At this time, logical product (AND) of the bit vector 202 and the bit string in each row of the bit matrix 203 is calculated.

Figure 4:
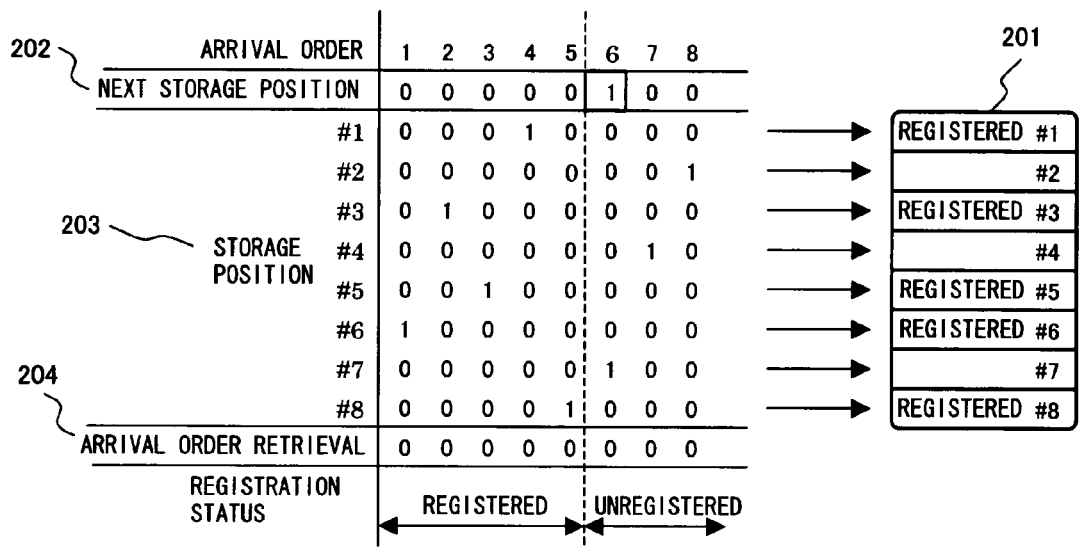
FIG. 4 is a diagram showing a second bit matrix.

In this case, logic "1" is included only in the AND operation result in the row of the storage position #8. The AND results in the rows of the other storage positions are all logic "0". The storage position #8 is acquired as the retrieval result in this way, and thus, the arrived instruction is stored in the storage position #8 of the memory region 201, as shown in FIG. 4. At this time, the pointer of the bit vector 202 (logic "1" bit) shifts one bit to the right (direction towards later arrival orders), and the bit of the arrival order 6 becomes logic "1".

Figure 5:
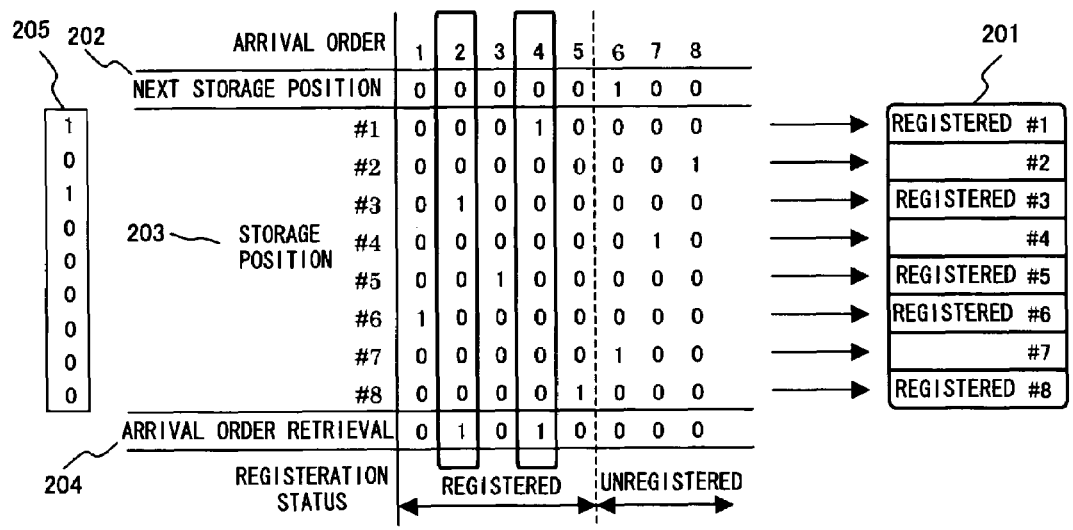
FIG. 5 is a diagram showing a third bit matrix.

Next, when an instruction that can be issued is present within the instructions stored in the memory region 201, the arrival order of the instruction is retrieved. For example, if the instructions in the storage positions #1 and #3 are in an issuable state, a bit vector 205, in which the storage positions of the instructions that can be issued are logic "1", is generated, as shown in FIG. 5, and the AND operation of the bit vector 205 and the bit string in each column of the bit matrix 203 is performed. Then, in the bit matrix indicating the AND operation result of each column, logical sum (OR) is calculated for each column and the results are stored in the bit vector 204.

At this time, the AND operation is performed in parallel between all elements in the bit vector 205 and all elements in the bit string of each column. Therefore, the instructions that can be issued can be retrieved quickly.

In this case, in the columns of arrival orders 2 and 4, the AND operation results include logic "1", and therefore, the OR operation results are logic "1". In this way, the arrival orders 2 and 4 are acquired as the retrieval results of the instructions that can be issued. However, the storage position of the instruction to be issued is not specified at this stage.

Figure 6:
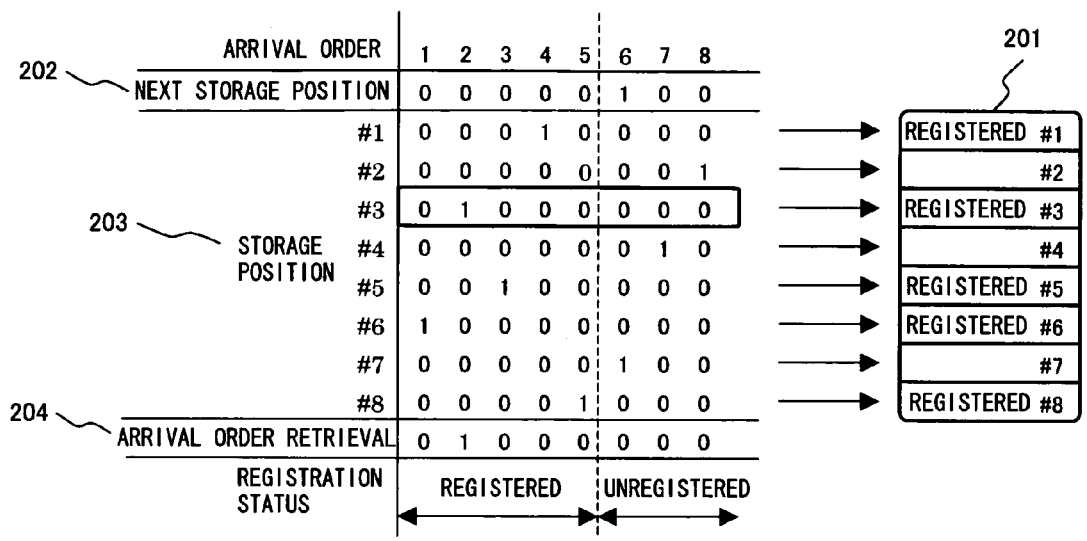
FIG. 6 is a diagram showing a fourth bit matrix.

Next, because the order 2 is the earlier order among the two acquired arrival orders, the storage position of the instruction of the arrival order 2 is retrieved. At this time, as shown in FIG. 6, the arrival order 4 in the bit vector 204 is changed to logic "0" and an AND operation of the bit vector 204, in which only the arrival order 2 is logic "1", and the bit string in each row of the bit matrix 203 is performed.

In this case, logic "1" is included only in the AND operation result of the row of the storage position #3. The AND results of the rows of the other storage positions are all logic "0". The storage position #3 is acquired as the retrieval result in this way, and thus, the instruction stored in the storage position #3 of the memory region 201 is issued.

Figure 7:
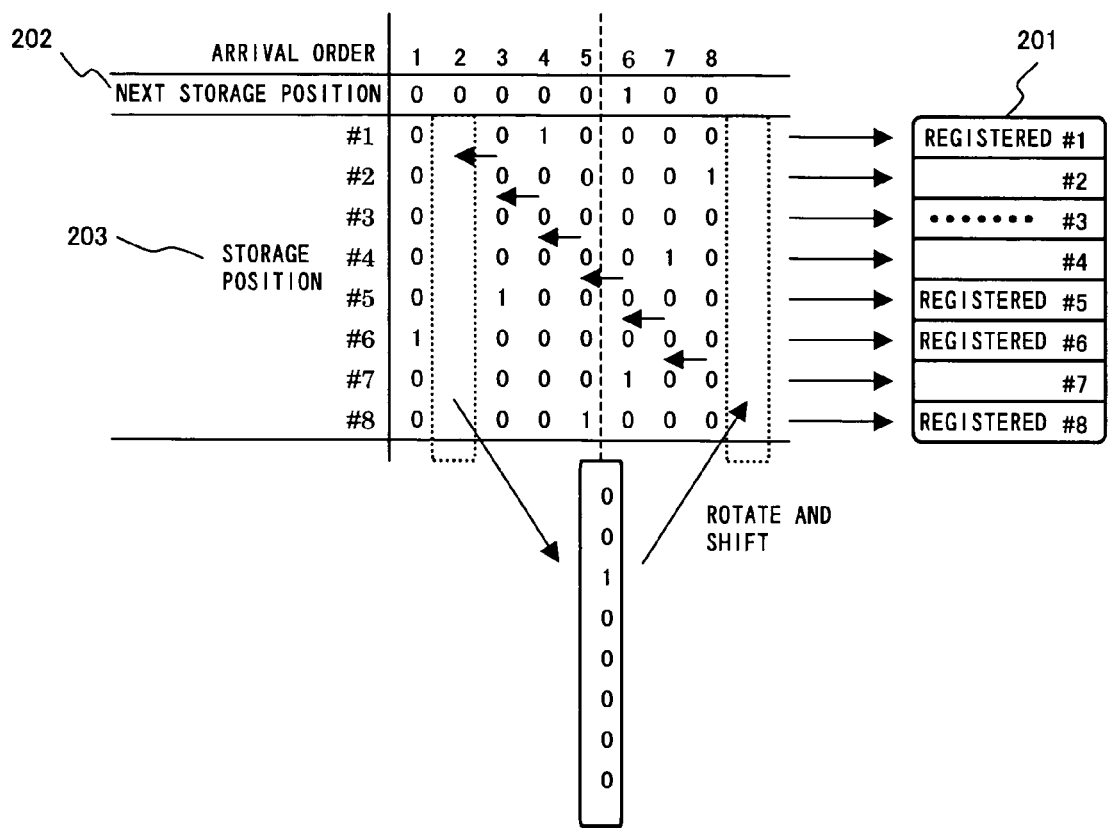
FIG. 7 is a diagram showing a fifth bit matrix.
Figure 8:
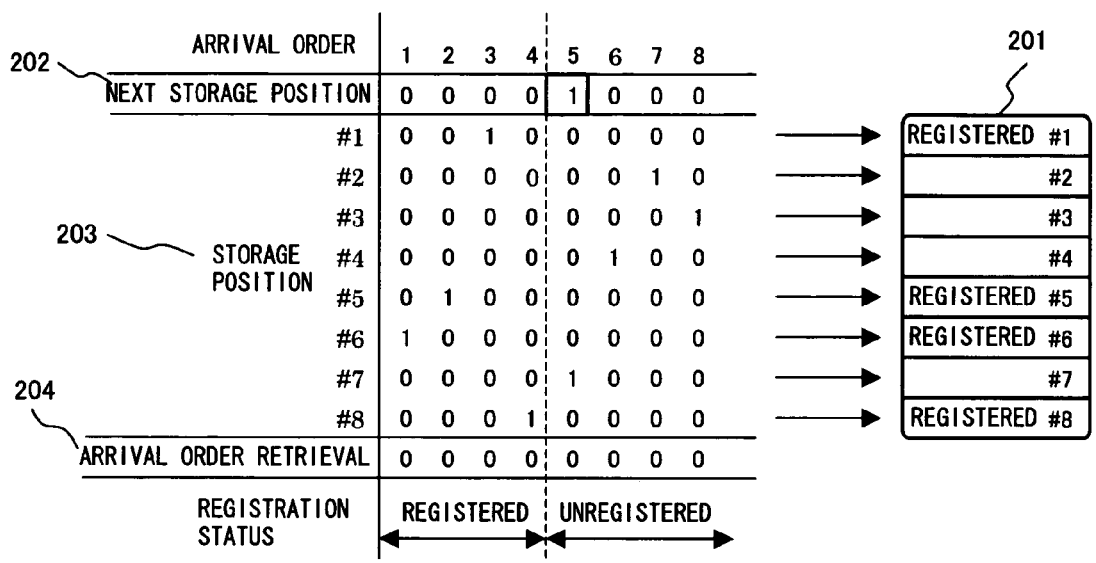
FIG. 8 is a diagram showing a sixth bit matrix.

When the instruction is issued, the columns of the arrival orders 2 to 8 are rotated and shifted so that the column of the arrival order 2 in the bit matrix 203 is placed last in order, as shown in FIG. 7, and the instruction in the storage position #3 is deleted. Then, the pointer of the bit vector 202 is shifted one bit to the left, as shown in FIG. 8, to advance the arrival order of the next storage position.

As initial values of the bit matrix 203, values such as those shown in FIG. 9 are used. At this time, the initial values of the bit vector 202 indicate the arrival order 1, and the instructions will be stored in the storage positions #1 to #8, in the order of arrival. The initial values of the bit matrix 203 are selected so that the bit position of logic "1" does not overlap between rows and between columns and are not necessarily limited to the values in FIG. 9.

According to the reordering control using a bit matrix such as the above, the following effects can be achieved:

(a) The arrival order of the instruction that can be issued can be retrieved quickly and accurately, simply by the performance of the AND operation between the bit vector, in which the storage position of the instruction that can be issued is logic "1", and the bit string of each column of the bit matrix. In the example described above, the instruction of the arrival order, corresponding to the column in which logic "1" is included in the AND operation result, can be issued.

(b) Even when a plurality of instructions can be issued, the same operation as that in (a), above, can be applied, simply by the generation of a similar bit vector, in which the storage positions of the instructions that can be issued are logic "1".

(c) When retrieving the instruction to be issued, the storage position of the instruction to be issued can be easily retrieved, simply by the performance of the AND operation between the bit vector, in which the arrival order of the instruction to be issued is logic "1", and the bit string in each row of the bit matrix.

(d) Even when a plurality of instructions can be issued, the same operation as that in (c), above, can be applied, simply by the selection of the instruction to be issued according to the arrival order.

(e) The next instruction to be issued can be decided without performing complicated operations, such as realigning the instructions within the memory region, by the performance of rotation and shift of the columns in the bit matrix so that the column of the arrival order of the issued instruction is placed in the last arrival order of the bit matrix.

(f) If the bit vector, in which the arrival order of the column indicating the storage position of the next instruction to arrive is logic "1", is held, the storage position to which the instruction is stored can be easily retrieved, simply by the performance of the AND operation between the bit vector and the bit string of each row of the bit matrix.

(g) In the bit vector in (f), above, the indicating storage position can be changed simply by the performance of a shift operation in the direction towards the later arrival orders when the instruction arrives and a shift operation in the direction towards the earlier arrival orders when the instruction is issued. The shift operation of the bit vector is performed separately from the rotation and shift of the bit matrix.

Figure 10:
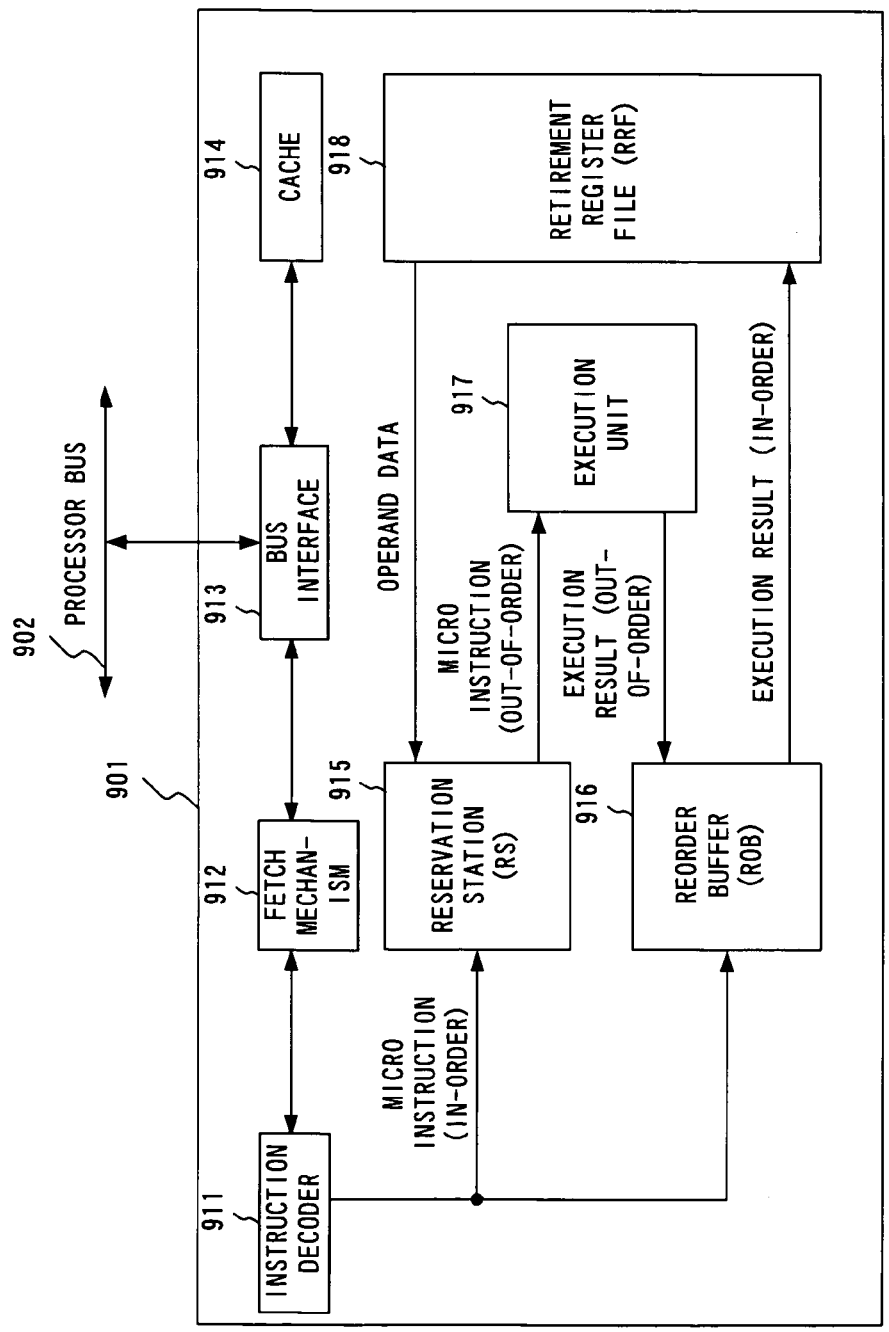
FIG. 10 is a block diagram of a microprocessor.
Figure 11A:
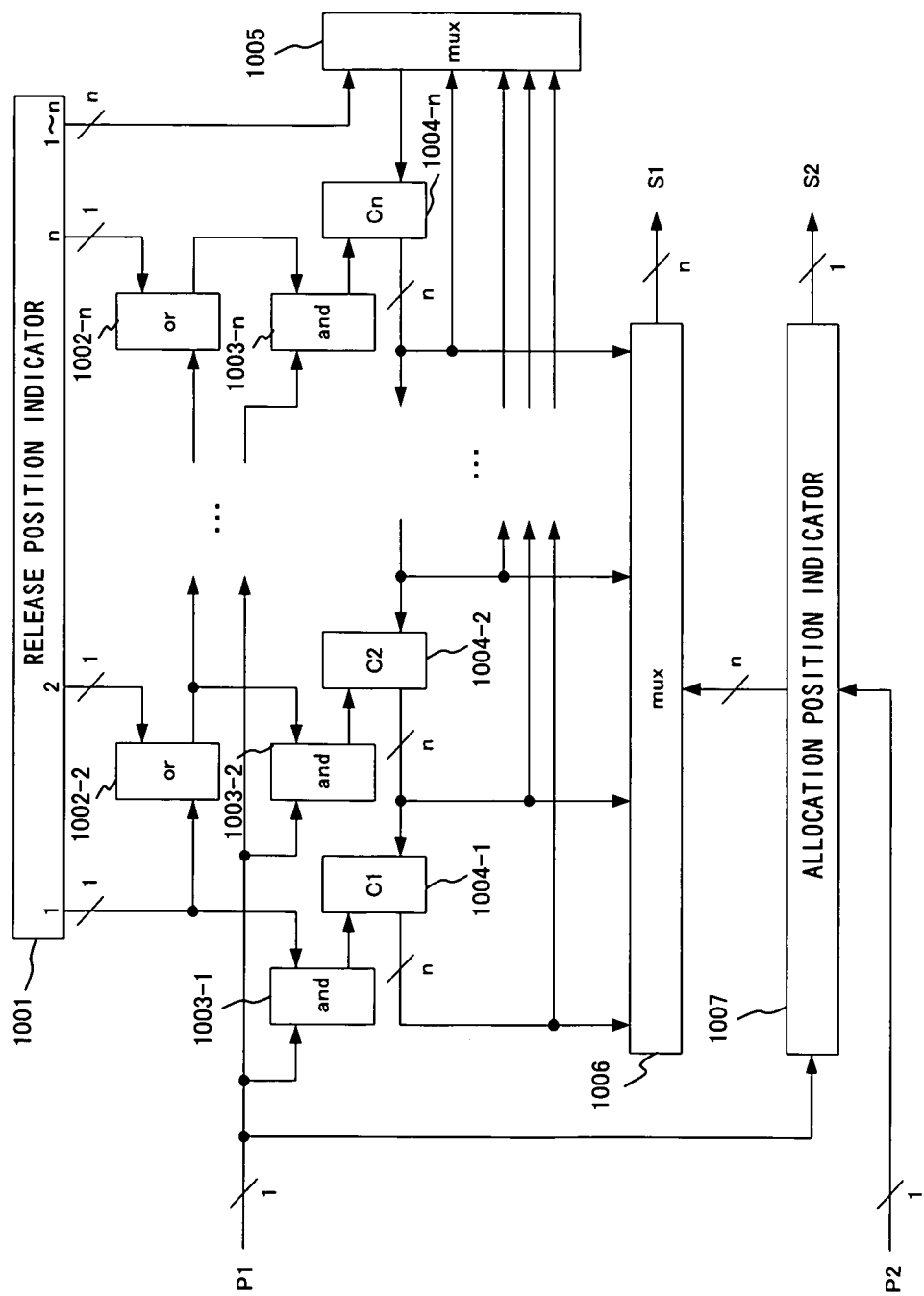
FIG. 11A is a block diagram (1) of a reordering circuit.
Figure 11B:
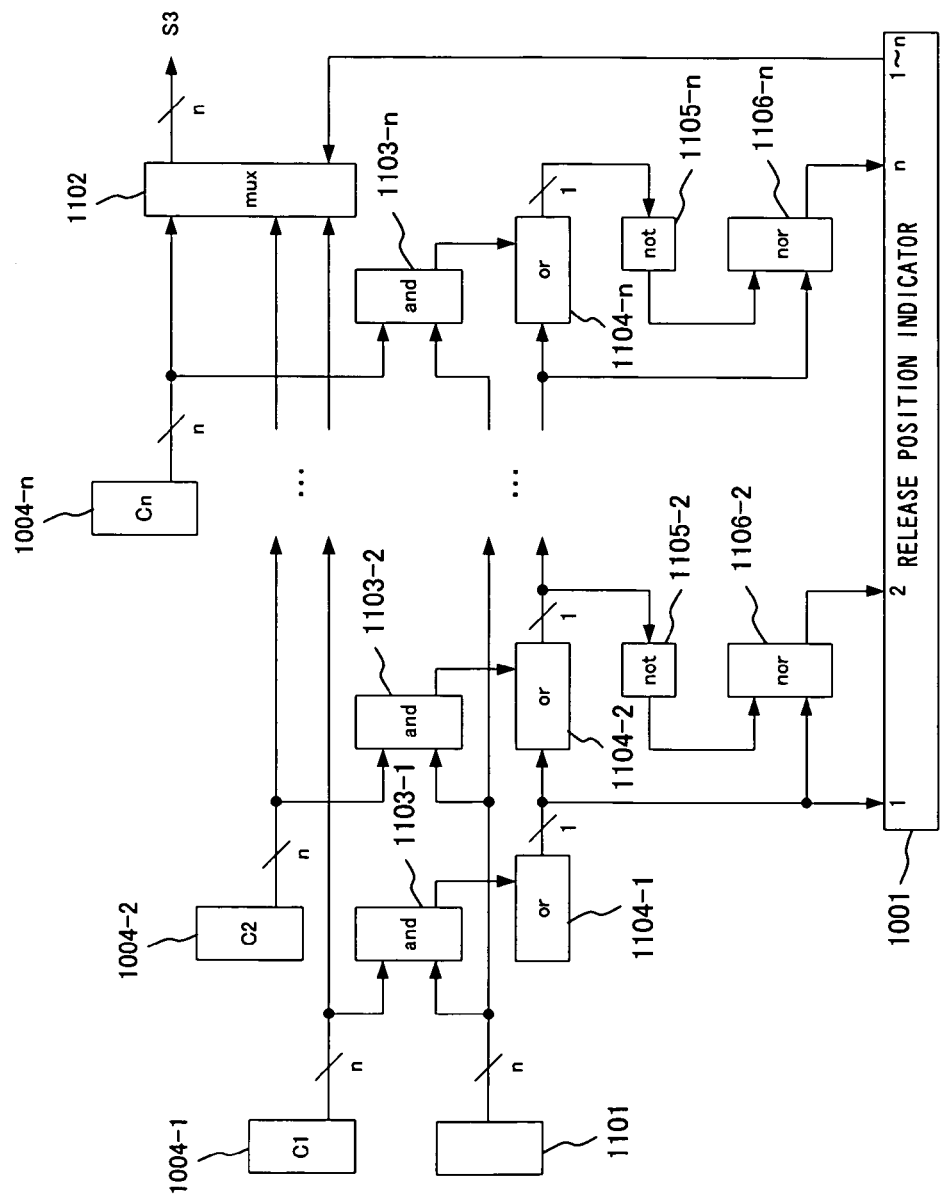
FIG. 11B is a block diagram (2) of the reordering circuit.

Next, a detailed example of when the foregoing reordering control is applied to an instruction processing in a central processing unit (CPU) is explained, with reference to FIG. 10 to FIG. 11B.

FIG. 10 shows a configuration example of a microprocessor that executes an instruction by an out-of-order method. A microprocessor 901 includes an instruction decoder 911, a fetch mechanism 912, a bus interface 913, a cache 914, a reservation station (RS) 915, a reorder buffer (ROB) 916, an execution unit 917, and a retirement register file (RRF) 918.

The bus interface 913 accesses an external memory (not shown) via a processor bus 902. The fetch mechanism 912 pre-fetches a macro instruction from the memory or the cache 914. The instruction decoder 911 converts the macro instruction to a micro instruction string.

The operands of the micro instruction are replaced with entries in the retirement register file 918 in preparation for out-of-order execution, and register renaming is performed. At this time, register renaming is performed so that an instruction, of which an operand is an execution result of a previous instruction, uses an entry as the operand, which is reserved as an execution result storage destination when the previous instruction is decoded.

An instruction issued from the instruction decoder 911 is temporarily inputted into the reservation station 915 and waits for operand data to which there is dependency. A scheduler in the reservation station 915 includes a reordering circuit and sequentially issues instructions from an oldest issued instruction, among the instructions of which the operand data is completely received. At this time, the reordering circuit changes the order of the micro instructions from the order of arrival (in-order) to the order in which the instructions can be issued (out-of-order).

However, the execution result of the micro instruction issued in-order (program order) from the instruction decoder 911 is required to be reflected in-order in the retirement register file 918. Thus, the out-of-order execution result outputted from the execution unit 917 is converted into in-order by the reorder buffer 916. As a result, when decoding the instruction, the entry of the reordering buffer 916 is reserved as the execution result storage destination.

FIG. 11A and FIG. 11B show configuration examples of the reordering circuit provided within the reservation station 915. The reordering circuit includes a release position indicator 1001, OR circuits 1002-2 to 1002-$n$ and 1104-1 to 1104-$n$, AND circuits 1003-1 to 1003-$n$ and 1103-1 to 1103-$n$, latch circuits 1004-1 to 1004-$n$ (Cl to Cn), multiplexers 1005, 1006, and 1102, an allocation position indicator 1007, a release request vector 1101, inverters 1105-2 to 1105-$n$, and NOR circuits 1106-2 to 1106-$n$.

The latch circuits 1004-1 to 1004-$n$ are respectively memory circuits, such as flip-flops, holding a bit string of n bits and correspond to the bit matrix 203 in FIG. 3. In this case, a bit matrix of n rows and n columns is held in the latch circuits 1004-1 to 1004-$n$, and a column of an arrival order i (i=1 to n) is held in a latch circuit 1004-$i$.

Latch circuits 1004-1 to 1004-$n$ always hold only one bit of logic "1" in respective different positions, and function as selectors that respectively indicate one of n entry storage positions in the memory region (not shown).

The release position indicator 1001 corresponds to the bit vector 204 in FIG. 6 and holds a bit vector of n bits indicating a position within an order of an entry (micro instruction) to be issued (released) next. However, if there is no entry to be released, all bits are logic "0".

The OR circuit 1002-2 outputs the logical sum of the first and second bits of the release position indicator 1001. The OR circuit 1002-$i$ (i=3 to n) outputs the logical sum of the output from the OR circuit 1002-(i−1) and the i-th bit of the release position indicator 1001.

The AND circuit 1003-1 outputs the logical product of a release indicating pulse P1 and the first bit of the release position indicator 1001 to the latch circuit 1004-1. The AND circuit 1003-$i$ (i=2 to n) outputs the logical product of the release indicator pulse P1 and the output of the OR circuit 1002-$i$ to the latch circuit 1004-$i$.

Therefore, if the release indicating pulse P1 is logic "1" when a k-th (k=1 to n) bit of the release position indicator 1001 is logic "1", the AND circuit 1003-1 to 1003-(k−1) outputs logic "0", and the AND circuit 1003-$k$ to 1003-$n$ outputs logic "1" (latch indicating signal).

The latch circuit 1004-$i$(i=k to n−1) outputs a bit string of n bits, and latches a bit string outputted from a latch circuit 1004-(i+1) when the AND circuit 1003-$i$ outputs the latch indicating signal. The latch circuit 1004-$n$ outputs a bit string of n bits, and latches the bit string outputted from the multiplexer 1005 when the AND circuit 1003-$n$ outputs the latch indicating signal.

The multiplexer 1005 selects the k-th bit string indicated by the release position indicator 1001, among the n number of bit strings outputted from the latch circuits 1004-1 to 1004-$n$, and outputs the selected bit string to the latch circuit 1004-$n$.

In this way, the latch circuits 1004-$k$ to 1004-$n$ perform the rotation and shift operation shown in FIG. 7, by the latch indicating signal generated from the release indicating pulse P1 and bit vector of the release position indicator 1001. At this time, the latch circuits 1004-1 to 1004-$n$ constantly maintain an allocation order (arrival order).

The allocation position indicator 1007 corresponds to the bit vector 202 in FIG. 3. The allocation position indicator 1007 holds n+1 bits, that is the total of a bit vector of n bits indicating the position within the order of the next entry to arrive and a save bit (1 bit) at the time of full-entry, and always holds only one bit of logic "1". The bit vector indicates any one of the latch circuits 1004-1 to 1004-$n$.

In addition, the allocation position indicator 1007 monitors the number of entry-registered storage positions by the position of the bit having the value of logic "1" within the bit vector and the save bit, and outputs a full-entry signal S2 as logic "1" when entries are stored in all storage positions.

The allocation position indicator 1007 shifts the bit vector to the direction in which entries decrease (left direction) when the release indicating pulse P1 is inputted, and shifts the bit vector to the direction in which the entries increase (right direction) when the allocation indicating pulse P2 is inputted. However, the shift operation is not performed when both pulses are inputted simultaneously.

The multiplexer 1006 selects the bit string indicated by the allocation position indicator 1007, among the n number of bit strings outputted from the latch circuit 1004-1 to 1004-$n$, and outputs the selected bit string as a storage allocating pointer S1. As a result, the next entry to arrive is stored in the storage position indicated by the storage allocating pointer S1.

The release request vector 1101 corresponds to the bit vector 205 in FIG. 5 and holds a bit vector of n bits. Each bit indicates a release request of each entry, and a bit corresponding to an entry requested to release holds the value of logic "1". Therefore, when the release of a plurality of entries is requested, a plurality of bits are logic "1".

The latch circuits 1004-1 to 1004-$n$ constantly maintain the allocation order. Therefore, by a comparison of the release request vector 1101 and these bit strings, information in the release request vector 1101 can be reordered in the order of allocation, and a position within the order of the oldest entry can be extracted. This operation is performed as follows:

The AND circuit 1103-$i$ ($i=1$ to n) outputs the logical product of the bit string outputted from the latch circuit 1004-$i$ and the release request vector 1101 to the OR circuit 1104-$i$.

The OR circuit 1104-1 outputs the logical sum (OR reduction) of n bits outputted from the AND circuit 1103-1. The OR circuit 1104-$i$ ($i=2$ to n) outputs the logical sum (OR reduction) of n bits outputted from the AND circuit 1103-$i$ and the output from the OR circuit 1104-($i-1$).

The inverter 1105-$i$($i=2$ to n) inverts the output from the OR circuit 1104-$i$. The NOR circuit 1106-$i$ outputs the inversion of the logical sum of the output of the inverter 1105-$i$ and the output of the OR circuit 1104-($i-1$).

The release position indicator 1001 holds the output of the OR circuit 1104-1 as the first bit and the outputs of the NOR circuits 1106-2 to 1106-$n$ as the second to n-th bits.

Therefore, if the logic "1" bit is included in the output from the k-th AND circuit 1103-$k$ (k<n), the OR circuit 1104-$k$ outputs logic "1" and all NOR circuits 1106-($k+1$) to 1106-$n$ output logic "0".

In this way, the release position indicator 1001 holds the bit vector, in which only the bit corresponding to the left-most position within the order is logic "1", among the positions within the order of the plurality of entries of which release is requested, and the other bits are logic "0". This bit vector indicates the position within the order of the oldest entry among the plurality of entries of which release is requested.

The multiplexer 1102 selects the bit string indicated by the release position indicator 1001, among the n number of bit strings outputted from the latch circuits 1004-1 to 1004-$n$ and outputs the selected bit string as a release entry pointer S3. As a result, the entry of the storage position indicated by the release entry pointer S3 is issued (released).

The circuit in FIG. 11B is provided to acquire the release entry pointer S3 from the release request vector 1101. However, in addition, the circuit can generally be used as a circuit for reordering to the allocation order, such as an operation to reorder matching results of allocation information and entry information in the allocation order.

According to the reordering circuit such as the above, the oldest issuable instruction can be accessed without counting a retaining time of each entry. Therefore, instructions can be executed in the out-of-order method more easily and more quickly.

The reordering control in the present invention can be applied, not only to instruction processing within a CPU, but also to various processing subjects. For example, when the processing subject is packet information within a packet transmission and reception device, a processing order of a plurality of packet information can be changed.

Figure 12:
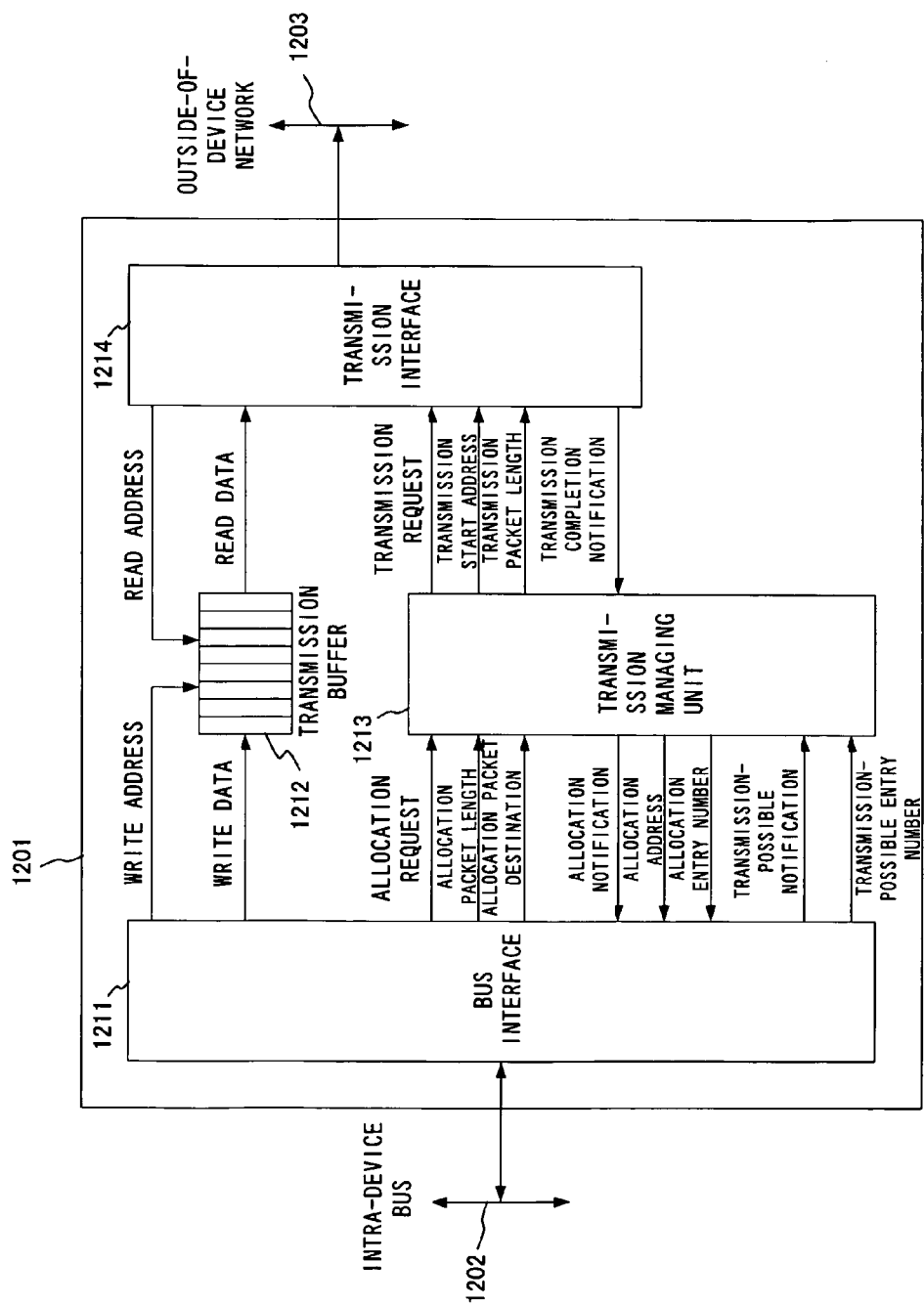
FIG. 12 is a block diagram of a communication LSI.

FIG. 12 shows a configuration example of a network communication large scale integration (LSI) used in a packet transmission and reception device such as the above. A communication LSI 1201 includes a bus interface 1211, a transmission buffer 1212, a transmission management unit 1213, and a transmission interface 1214.

When transmitting a packet, an upper level program transfers a packet transmission request to the communication LSI 1201 via an intra-device bus 1202. Upon receiving the request, the bus interface 1211 transfers a packet length and a packet destination to the transmission management unit 1213 and requests allocation of the transmission buffer 1212.

When the allocation request can be executed, the transmission management unit 1213 internally generates a packet control information entry, transfers an allocation address of the transmission buffer 1212 and a number of the generated entry to the bus interface 1211, and performs allocation notification. Upon receiving the notification, the bus interface 1211 starts to write packet data into the transmission buffer 1212.

When the writing of the packet data has completed, the bus interface 1211 transfers a number of the allocated entry that can be transmitted and performs transmission-possible notification to the transmission management unit 1213.

If a transmittable packet is present, the transmission management unit 1213 transmits a transmission start address and a transmission packet length to the transmission interface 1214 and performs a transmission request. Upon receiving the request, the transmission interface 1214 reads the packet data from the transmission buffer 1212 and transmits the read data to the destination via an outside-of-device network 1203. After a transmission completion notification is received from the transmission interface 1214, the transmission management unit 1213 deletes the corresponding entry.

In a transmission control such as the above, with regards to a plurality of packets, the bus interface 1211 performs a direct memory access (DMA) transfer for writing data of these packets in parallel, and therefore, the transmission management unit 1213 is required to simultaneously maintain a plurality of entries. In addition, to effectively use the bandwidth of the network, a packet that has been allocated later is required to be transmitted when the packet becomes transmittable, and the entries are required to be released in an order differing from the allocation order, among packets with differing destinations.

Therefore, the reordering circuit shown in FIG. 11A and FIG. 11B is provided within the transmission management unit 1213, and reordering control of the packets is performed. In this case, packet control information is stored in the memory region as an entry and the transmission completion notification from the transmission interface 1214 is reflected in the bit value of the release request vector 1101.

In a conventional transmission management unit, the entry of the next packet to be transmitted is retrieved successively, or a hardware implementation using a large-scale queue circuit with a forwarding function is required. On the other hand, according to the reordering circuit of the present invention, retrieval can be performed quickly with a small-scale circuit, and therefore, a large number of short packets can be reordered and transmitted.

In the communication LSI 1201 in FIG. 12, the reordering is performed with the transmission packet information as the processing subject. However, reordering can be performed similarly with reception packet information as the processing subject.

The reordering control of the present invention can be implemented, not only by a hardware circuit, but also by software performing parallel processing. For example, using a parallel computer such as that shown in FIG. 13, a parallel processing of a bit matrix can be performed by n number of processing elements (PE) 1301-1 to 1301-$n$.

In this case, a column of an arrival order i of the bit matrix having n rows and n columns and a program performing the reordering control shown in FIG. 3 to FIG. 8 are stored in a memory of PE 1301-$i$ ($i=1$ to n). Then, the PE 1301-1 to 1301-$n$ process columns of arrival orders 1 to n in parallel and perform the reordering control, by executing the program while communicating with other PE.

What is claimed is:

1. A reordering apparatus that determines a processing order of a plurality of selected entries selected from a plurality of entries to be processed, processes the selected entries and reorders a plurality of remaining entries, the reordering apparatus comprising:
   a memory device that stores a plurality of entries to be processed in different storage positions;
   a matrix device that stores matrix information, in which row numbers of the matrix information correspond to the storage positions of the entries within the memory device and column numbers of the matrix information correspond to positions of the entries within an arrival order, and a matrix element corresponding to the storage position and the position within the arrival order of each entry stored in the memory device has a predetermined value;
   a vector device that holds first vector information indicating one or more storage positions of one or more first processable entries stored in the memory device; and
   a control device that performs an operation between the first vector information and each column of the matrix information to generate second vector information indicating one or more positions of the one or more first processable entries within the arrival order and identifying the processing order from operation results of respective columns, determines a selected entry among second processable entries in which corresponding second vector information has a predetermined value, the second processable entries comprising the first processable entries included in the operation results of the respective columns, and processes the selected entry.

2. The reordering apparatus according to claim 1, wherein a matrix element of the matrix information corresponding to one of the storage positions waiting to store one of the entries and a position of the one of the entries within the arrival order assigned to the one of the storage positions has the predetermined value.

3. The reordering apparatus according to claim 1, wherein the control device calculates a logical product of each element in the first vector information and each element of each column of the matrix information to generate third vector information as a calculation result of each column, and calculates a logical sum of all elements in the third vector information for each column to generate the second vector information.

4. The reordering apparatus according to claim 2, wherein the control device rotates and shifts columns of the matrix information when the selected entry is processed, so that the column corresponding to the selected entry is placed last in the arrival order.

5. The reordering apparatus according to claim 2,
   further comprising a pointer device that holds pointer information indicating a head position within the arrival order, among positions within the arrival order assigned to a plurality of storage positions waiting to store an entry, and
   wherein the control device selects the selected entry as having the predetermined value in the column corresponding to the position within the arrival order indicated by the pointer information and stores a new entry in the storage position corresponding to the obtained element.

6. The reordering apparatus according to claim 5, wherein the control device updates the pointer information of the pointer device so that the pointer information indicates a new head position within the arrival order when a new entry is stored in the memory device and when one of the entries stored in the memory device is processed.

7. The reordering apparatus according to claim 1, wherein the control device selects a first position within the arrival order, among the one or more positions within the arrival order indicated by the second vector information, as the position of one of the entries within the arrival order to be processed.

8. The reordering apparatus according to claim 1, wherein the memory device stores a plurality of instructions as the plurality of entries to be processed, and the control device performs to issue the instructions stored in the memory device, in an information processing device.

9. The reordering apparatus according to claim 1, wherein the memory device stores a plurality of packet information entries as the plurality of entries to be processed, and the control device processes the packet information entries stored in the memory device.

10. A computer-readable recording medium storing a program for a computer that holds a plurality of entries as processing subjects, determines a processing order of a plurality of selected entries selected from the plurality of entries as processing subjects, processes the selected entries and reorders a plurality of remaining entries, wherein the program enables the computer to perform a process comprising:
    storing an incoming entry to be processed in a storage position different from a storage position that stores the other entry within a memory device;
    assigning a predetermined value to an element of matrix information corresponding to a storage position and a position within an arrival order of each stored entry, where row numbers of the matrix information correspond to the storage positions of the stored entries within the memory device and column numbers of the matrix information correspond to positions of the stored entries within the arrival order;
    performing an operation between first vector information indicating one or more storage positions of one or more processable entries stored in the memory device and each column of the matrix information, and generating second vector information indicating one or more positions within the arrival order of one or more processable entries and identifying the processing order from operation results of respective columns;
    selecting a position of a selected entry within the arrival order to be processed from the positions within the arrival order of the one or more entries indicated by the second vector information having a predetermined value;
    obtaining a matrix element having the predetermined value in a column corresponding to the position selected within the arrival order; and
    processing a corresponding entry stored in a storage position corresponding to the obtained element, thereby actualizing a processing according to the processing order.

11. A reordering apparatus that determines a processing order of a plurality of selected entries selected from a plurality of entries to be processed, processes the selected entries and reorders a processing order of a plurality of remaining entries, the reordering apparatus comprising:
    memory means for storing a plurality of entries to be processed in different storage positions;
    matrix means for storing matrix information, in which row numbers of the matrix information correspond to the storage positions of the entries within the memory means and column numbers of the matrix information correspond to positions of the entries within an arrival order, and a matrix element corresponding to the storage position and the position within the arrival order of each entry stored has a predetermined value;

vector means for holding first vector information indicating one or more storage positions of one or more processable entries stored in the memory means; and control means for performing an operation between the first vector information and each column of the matrix information, generating second vector information indicating one or more positions of the one or more processable entries within the arrival order and identifying the processing order from operation results of respective columns, selecting a position of an entry within the arrival order from the positions within the arrival order indicated by the second vector information having a predetermined value, obtaining an element having the predetermined value in a column corresponding to the selected position within the arrival order, and processing a corresponding entry in a storage position corresponding to the obtained element, thereby actualizing a processing according to the processing order.

12. The reordering apparatus according to claim 1, wherein:

the control device selects a position within the arrival order of one of indicated entries to be processed indicated by the second vector information, obtains an element having the predetermined value in a column corresponding to the position selected within the arrival order, and processes a corresponding entry in a storage position corresponding to the obtained element, thereby actualizing a processing according to the processing order.

* * * * *